Oct. 30, 1934.  D. PILAAR  1,979,077
AUTOMATIC TRANSMISSION
Filed July 24, 1933
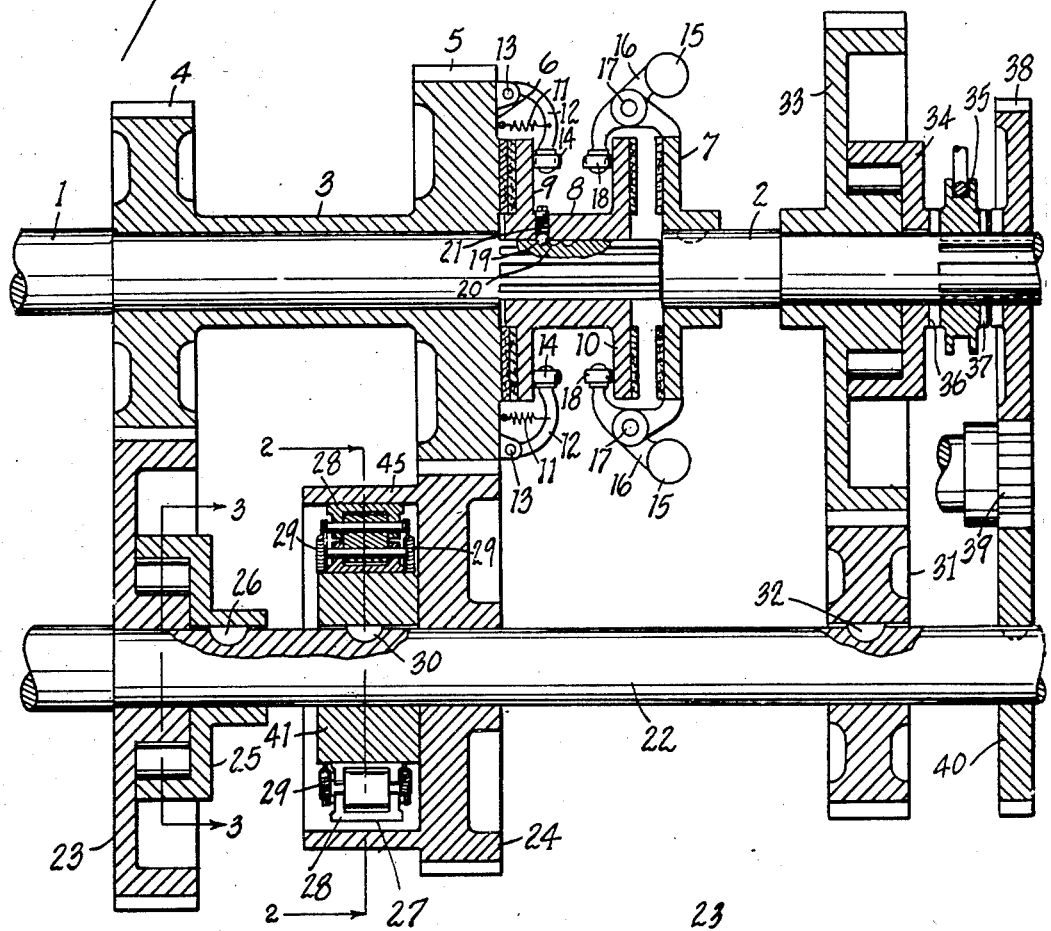
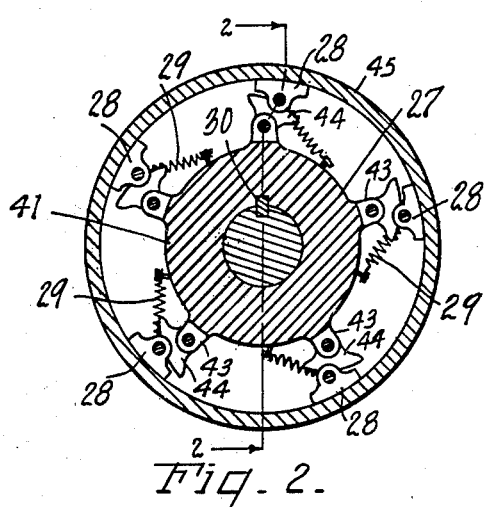
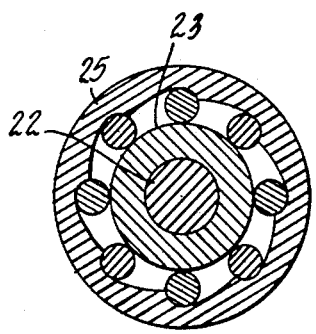
INVENTOR
Donald Pilaar
BY
Barnwell R. King.
ATTORNEY Patented Oct. 30, 1934

1,979,077

UNITED STATES PATENT OFFICE 1,979,077

AUTOMATIC TRANSMISSION

Donald Pilaar, Kalamazoo, Mich., assignor of one-half to Barnwell R. King, Kalamazoo, Mich.

Application July 24, 1933, Serial No. 681,814

4 Claims. (Cl. 74—336)

The main objects of my invention are;

First, to provide an automatic transmission of improved construction for automotive vehicles and the like.

Second, to provide a transmission of this character which automatically shifts from low to second speed and from second to high speed smoothly and quietly.

Third, to provide a transmission in which the shift from first to second speed is entirely automatic, the gears being in constant mesh and therefore noiseless at these speeds.

Fourth, to provide means for automatically establishing direct drive when the driven shaft reaches a predetermined speed and at the same time discontinuing the operation of the second and low speed gears and countershaft.

Fifth, to provide an automatic transmission using conventional and readily obtainable parts.

Sixth, to provide an automatic transmission using standard shifts and standard gears and countershaft.

Seventh, to provide a transmission having the above desirable features and characteristics, which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary section of my automatic transmission.

Fig. 2 is a detail section on line 2—2 of Fig. 1; and,

Fig. 3 is a detail section of Fig. 1.

In the drawing, numeral 1 represents the drive shaft and 2 the driven shaft, these shafts being aligned as shown. Rotatable on the drive shaft 1, is a gear assembly 3 having a low speed gear 4 and a second speed gear 5. The latter constitutes a gear clutch member 6, while a direct drive clutch member 7 is carried by the driven shaft 2. A sleeve 8 is splined to the drive shaft 1 and has a gear clutch member 9 at its inner end and a direct drive clutch member 10 at its outer end.

The sleeve is urged to close the gear clutch 6, 9 and open the direct drive clutch 7, 10 by the tension springs 11 acting through the arms 12 pivoted to the gear 5 at 13 and having rollers 14 at their free ends engaging the back of the gear clutch member 9. When the driven shaft 2 reaches a predetermined speed, the weights 15 on the levers 16 pivoted at 17 to the direct drive member 7, acting under the influence of centrifugal force, cause the rollers 18 to engage the back of the member 10 and shift the sleeve to open the gear clutch and close the direct drive clutch. The sleeve is releasably held in position by the ball detent 19 which is actuated into the sockets 20 in the drive shaft by the spring 21.

The countershaft 22 has the low speed driven gear 23 and the second speed driven gear 24 rotatably mounted thereon and in constant mesh with the low speed gear 4 and second speed gear 5, respectively, on the drive shaft. The gear teeth are preferably helical for silent operation. The low speed driven gear 23 is connected to the countershaft by an over-running clutch or free wheeling unit 25 which is keyed to the countershaft at 26.

The second speed driven gear 24 is adapted to be connected to the countershaft 22, when the latter reaches a predetermined speed, by the centrifugally operated clutch 27. The shoes 28 of the clutch 27 are urged inwardly by the springs 29, so that the gear 24 turns freely so long as the countershaft rotates below the predetermined speed, the clutch 27 being keyed to the countershaft at 30.

Upon the hub 41 are a number of standards 43 in which are pivotally mounted links 44, the latter carrying at their extremities the pivotally mounted gripping shoes 28. The shoes coact with the drum 45 on the gear 24 when the speed of the countershaft 22 reaches or exceeds a predetermined speed, the drive being from the drum to the hub at such speed. This automatically shifts the drive from the low speed gears 4 and 23 to the second speed gears 5 and 24.

The countershaft gear 31 is keyed to the countershaft at 32 and is in constant mesh with the driven gear 33 rotatable on the driven shaft 2. The gear 33 is connected to the driven shaft by the free wheeling unit or over-running clutch 34, and the sleeve 35 which is splined to the driven shaft for opening the clutch 36 and closing the reversing clutch 37. The latter is associated with gear 38 which is in mesh with gear 39 which in turn is in mesh with gear 40 on the countershaft. These reversing gears form no part of my invention. The sleeve 35 is manually controlled, as by a push-pull lever on the instrument board of the vehicle.

In operation, the sleeve 35 is adjusted to its neutral position and the engine (not shown) is started. The foot pedal (not shown) of the main clutch (not shown) connecting the drive shaft 1 to the engine is then depressed and the sleeve 35 is shifted to move into engagement with the free wheeling unit 34. The foot pedal is then gradually released and the automatic transmission starts the car in low speed, automatically shifts to second speed and finally into high speed.

The train of gears for the low speed ratio is as follows: drive shaft 1, sleeve 8, clutch 6, 9, gear unit 3, low speed drive gear 4, low speed countershaft gear 23, over-running clutch 25, countershaft 22, countershaft gear 31, driven gear 33, over-running clutch 34, sleeve 35, clutch 36 and driven shaft 2.

The train of gears for the second speed ratio is as follows: drive shaft 1, sleeve 8, clutch 6, 9, gear unit 3, second speed drive gear 5, second speed countershaft gear 24, centrifugal clutch 27, countershaft gear 31, driven gear 33, over-running clutch 34, sleeve 35, clutch 36, and driven shaft 2.

In high speed the drive shaft 1 and the driven shaft 2 are connected by sleeve 8 and clutch 7, 10.

To reverse the car, the sleeve 35 is shifted to move clutch 37 into engagement with the gear 38, before releasing the foot pedal. As explained above, the clutch 35 may be manually controlled as by a push-pull knob on the instrument board of the car.

The train of gears for the reverse speed ratio is as follows: drive shaft 1, sleeve 8, clutch 6, 9, gear unit 3, low speed drive gear 4, low speed countershaft gear 23, over-running clutch 25, countershaft 22, gear 40, reverse gear 39, gear 38, reverse clutch 37, and driven shaft 2. If the speed in reverse is sufficient to operate the centrifugal clutch 27, the countershaft is driven by the second speed gears, thus providing a second speed in reverse.

The transmission is entirely automatic and noiseless in operation in all forward speeds and also in reverse. When the car is stopped, the springs 11 act to open the direct drive clutch and close the gear clutch, placing the parts in position for starting the car from a standstill position.

I have illustrated and described my improvements in embodiment which I have found very practical. I have not attempted to illustrate or describe other embodiments or adaptations, as it is belived this disclosure will enable those skilled in the art to embody or adapt my improvements as may be desired.

I claim:

1. An automatic transmission comprising in combination a drive shaft, a driven shaft in line with said drive shaft, a low and second speed gear assembly rotatable on said drive shaft, a gear clutch member on said assembly, a direct drive clutch member on said driven shaft, a sleeve splined to said drive shaft and having a gear clutch member at one end and a direct drive clutch member at the other end, spring means urging said sleeve to close the gear clutch and open the direct drive clutch, centrifugally operated means for shifting said sleeve to open the gear clutch and close the direct drive clutch when the driven shaft reaches a predetermined speed, a countershaft, a low speed driven gear rotatable on said countershaft and in constant mesh with the low speed gear on said drive shaft, an over-running clutch disposed between said low speed driven gear and said countershaft for establishing a driving connection from the low speed driven gear to the countershaft when the low speed driven gear exceeds the speed of the countershaft, a second speed driven gear rotatable on said countershaft and in constant mesh with the second speed gear on said drive shaft, a centrifugally operated clutch disposed between said second speed driven gear and said countershaft for establishing a driving connection from the second speed driven gear to the countershaft when the second speed driven gear exceeds the speed of the countershaft, a countershaft gear rotatable with said countershaft, a driven gear rotatable on said driven shaft and in constant mesh with said countershaft gear, and an over-running clutch disposed between said driven gear and said driven shaft for establishing a driving connection from the driven gear to the driven shaft when the speed of the driven gear exceeds the speed of the driven shaft.

2. An automatic transmission comprising in combination a drive shaft, a driven shaft in line with said drive shaft, a low and second speed gear assembly rotatable on said drive shaft, a gear clutch member on said assembly, a direct drive clutch member on said driven shaft, a sleeve splined to said drive shaft and having a gear clutch member at one end and a direct drive clutch member at the other end, spring means urging said sleeve to close the gear clutch and open the direct drive clutch, means for shifting said sleeve to open the gear clutch and close the direct drive clutch when the driven shaft reaches a predetermined speed, a countershaft, a low speed driven gear rotatable on said countershaft and in constant mesh with the low speed gear on said drive shaft, an over-running clutch disposed between said low speed driven gear and said countershaft, a second speed driven gear rotatable on said countershaft and in constant mesh with the second speed gear on said drive shaft, a centrifugally operated clutch disposed between said second speed gear and said countershaft, a countershaft gear rotatable with said countershaft, a driven gear rotatable on said driven shaft and in constant mesh with said countershaft gear, and an over-running clutch disposed between said driven gear and said driven shaft.

3. A transmission comprising in combination; a drive shaft, low and second speed drive gears on said drive shaft, a countershaft, low and second speed countershaft gears in constant mesh with said low and second speed drive gears, an over-running clutch disposed between said low speed countershaft gear and said countershaft, an over-running centrifugal toggle type clutch disposed between said second speed countershaft gear and said countershaft, a driven shaft, a countershaft gear, a driven gear in constant mesh with said countershaft gear, an over-running clutch disposed between said driven gear and said driven shaft, a clutch associated with said drive shaft and said low and second speed drive gears, a clutch associated with said drive shaft and said driven shaft for connecting the same in direct driving relation, means for operating said last named clutches so that one opens as the other closes.

4. A transmission comprising in combination; low and second speed driving gears, a countershaft, low and second speed driven gears on said countershaft and in mesh with said low and second speed driving gears, respectively, an over-running clutch connecting said low speed countershaft gear and the countershaft, and a centrifugal clutch connecting said second speed countershaft gear and the countershaft, the last named clutch being controlled by the speed of the countershaft, a driven shaft, a countershaft gear on said countershaft, a driven gear in mesh with said countershaft gear, and an over-running clutch connecting the driven gear and driven shaft.

DONALD PILAAR.